Nov. 9, 1926.

H. A. SELAH 1,606,188

FITTING

Filed Sept. 5, 1925

INVENTOR.
Howard A. Selah
BY
ATTORNEY

Patented Nov. 9, 1926.

1,606,188

UNITED STATES PATENT OFFICE.

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA.

FITTING.

Application filed September 5, 1925. Serial No. 54,775.

This invention is exemplified as a coupling to connect threadless conduits and comprises a contractible sleeve conforming in many respects to contractible sleeves used in other conduit fittings heretofore designed. Features and details of the invention will appear from the specification and claims.

The invention is illustrated in the accompanying drawings as follows:—

Figure 1:
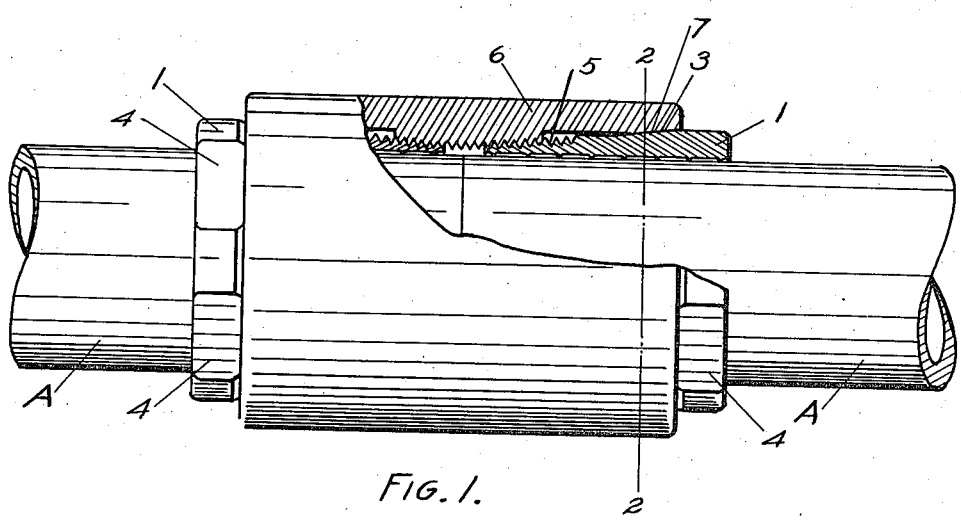

Fig. 1 shows a side elevation, partly in section, of the coupling.

Figure 2:
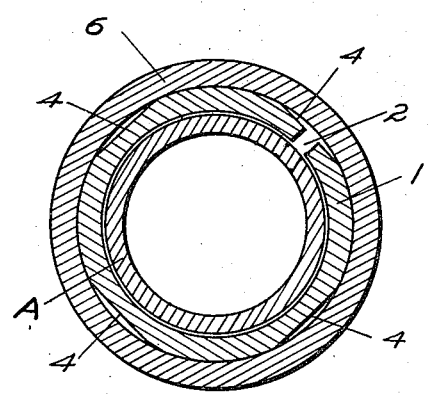

Fig. 2 a section on the line 2—2 in Fig. 1.

1 marks the contractible sleeve made contractible by a longitudinal slit 2. The sleeve has a tapered outer end 3 with flats 4 forming wrenchholds on the sleeve. The inner end of the sleeve is provided with a screw thread 5. A coupling sleeve 6 has screw threads at its center adapted to receive the screw threads 5 and is tapered at 7 to conform to the taper 3 of the contractible sleeve. Conduits A are shown in place in the coupling.

The coupling is attached by placing the ends of the conduits in the contractible sleeves. By turning the contractible sleeves the screws gradually draw the sleeves into the coupling sleeve, thus through the wedging action, or tapered engagement of the sleeve contracting the contractible sleeve into clamping engagement with the conduits.

What I claim as new is:—

1. In a fitting, the combination of a body having an opening having an inner portion screw threaded and an outer portion unthreaded; and a slotted sleeve in the opening having its inner end screw threaded to screw into the threads in the body and an intermediate portion unthreaded, one of said unthreaded portions being tapered and in wedging engagement with the other unthreaded portion to contract the sleeve into clamping engagement with a conduit, said sleeve having a wrenchhold extension projecting from the body with the sleeve in place.

2. In a fitting, the combination of a body having an opening having an inner portion screw threaded and an outer portion unthreaded; and a sleeve in the opening having its inner end screw threaded to screw into the threads in the body and an intermediate portion unthreaded, one of said unthreaded portions being tapered and in wedging engagement with the other unthreaded portion, said sleeve comprising slotted means permitting the sleeve to contract in response to said wedging action into clamping engagement with a conduit with the inner wall of the sleeve throughout the major portion of its length contracting in parallel with the axis, said sleeve having a wrenchhold extension projecting from the body with the sleeve in place.

3. In a fitting, the combination of a body having an opening having an inner portion screw threaded and an outer portion unthreaded; and a sleeve slotted throughout its length having its inner end screw threaded to screw into the threads in the body and an intermediate portion unthreaded, one of said unthreaded portions being tapered and in wedging engagement with the other unthreaded portion to contract the sleeve into clamping engagement with a conduit, said sleeve having a wrenchhold extension projecting from the body with the sleeve in place.

4. In a coupling, the combination of a body having an opening with inner portions screw threaded and outer portions unthreaded; slotted sleeves in the opening, each having screw threaded inner portions screwing into a threaded portion of the body and an unthreaded portion engaging an unthreaded portion of the body, one of the unthreaded engaging portions at each end of the coupling being tapered and in wedging engagement with the other unthreaded portion at said end to contract the sleeve into clamping engagement with a conduit, said sleeves having wrenchhold extensions projecting from the body with the sleeves in place.

5. In a coupling, the combination of a body having an opening with inner portions screw threaded and outer portions unthreaded; sleeves in the opening, each having a screw threaded inner portion screwing into a threaded portion of the body and an unthreaded portion engaging an unthreaded portion of the body, one of the unthreaded engaging portions at each end of the coupling being tapered and in wedging engagement with the other unthreaded portion at said end, said sleeve comprising slotting means permitting the sleeve to contract in response to said wedging action into clamping engagement with a conduit with the inner wall of the sleeve throughout the major portion of its length contracting in parallel with the axis, said sleeves having wrenchhold extensions projecting from the body with the sleeves in place.

6. In a coupling, the combination of a body having an opening with inner portions screw threaded and outer portions unthreaded; slotted sleeves in the opening, each slotted throughout its length and having a screw threaded inner portion screwing into a threaded portion of the body and an unthreaded portion engaging an unthreaded portion of the body, one of the unthreaded engaging portions at each end of the coupling being tapered and in wedging engagement with the other unthreaded portion at said end and contracting the sleeve in response to said wedging action into clamping engagement with a conduit, said sleeves having wrenchhold extensions projecting from the body with the sleeves in place.

In testimony whereof I have hereunto set my hand.

HOWARD A. SELAH.